US012659825B2

(12) United States Patent
Yamaguchi

(10) Patent No.: US 12,659,825 B2
(45) Date of Patent: Jun. 16, 2026

(54) DRIVING ASSIST SYSTEM FOR REMOTE OR TRAFFIC CONTROL OF AN AUTOMATED DRIVING VEHICLE AND HANDOFF OF THE AUTOMATED DRIVING VEHICLE BETWEEN BASE STATIONS BASED ON THE QUALITY OF COMMUNICATION

(71) Applicant: SUBARU CORPORATION, Tokyo (JP)

(72) Inventor: Fumihito Yamaguchi, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 389 days.

(21) Appl. No.: 18/299,971

(22) Filed: Apr. 13, 2023

(65) Prior Publication Data

US 2023/0370923 A1    Nov. 16, 2023

(30) Foreign Application Priority Data

May 10, 2022    (JP) ................................. 2022-077728
Mar. 15, 2023    (JP) ................................. 2023-041334

(51) Int. Cl.
*H04W 36/08*    (2009.01)
*H04W 36/30*    (2009.01)

(52) U.S. Cl.
CPC ......... *H04W 36/08* (2013.01); *H04W 36/304* (2023.05)

(58) Field of Classification Search
None
See application file for complete search history.

(56) References Cited

U.S. PATENT DOCUMENTS

| | | | | |
|---|---|---|---|---|
| 2017/0215121 | A1* | 7/2017 | Condeixa | ................ H04W 4/40 |
| 2018/0234901 | A1* | 8/2018 | Suh | ..................... H04W 36/322 |
| 2021/0127309 | A1* | 4/2021 | Sheriff | .................. H04W 36/38 |
| 2021/0219379 | A1 | 7/2021 | Otaka et al. | |
| 2023/0370923 | A1* | 11/2023 | Yamaguchi | ........... H04W 36/08 |
| 2024/0172075 | A1* | 5/2024 | Condeixa | ............. H04B 17/318 |
| 2024/0267816 | A1* | 8/2024 | Chorppath | .............. H04W 4/44 |

FOREIGN PATENT DOCUMENTS

| | | | | |
|---|---|---|---|---|
| EP | 3860221 A1 * | 8/2021 | ............ | H04W 36/22 |
| JP | 2021-111884 A | 8/2021 | | |
| TW | 201811594 A * | 4/2018 | .......... | H04W 36/322 |
| WO | WO-2018182696 A1 * | 10/2018 | ............ | H04W 48/16 |
| WO | WO-2022171701 A1 * | 8/2022 | ........... | G05D 1/0022 |

OTHER PUBLICATIONS

PE2E-Search Machine Translation of TW 201811594 A, published Apr. 1, 2018 (Year: 2018).*

* cited by examiner

*Primary Examiner* — Rafael Pérez-Gutiérrez
(74) *Attorney, Agent, or Firm* — Rimon P.C.

(57) ABSTRACT

A driving assist system includes a plurality of base stations and a processor. The base stations are configured to be connected to an automated driving vehicle. The processor is configured to transmit, to the automated driving vehicle and based on a quality of communication between a first base station and the automated driving vehicle and a quality of communication between a second base station and the automated driving vehicle, a switching request of switching from the first base station to the second base station. The first base station is one of the base stations to which the automated driving vehicle is connected. The second base station is another one of the base stations and adjacent to the first base station, and is a candidate of the switching from the first base station.

4 Claims, 10 Drawing Sheets

1

DRIVING ASSIST SYSTEM FOR REMOTE OR TRAFFIC CONTROL OF AN AUTOMATED DRIVING VEHICLE AND HANDOFF OF THE AUTOMATED DRIVING VEHICLE BETWEEN BASE STATIONS BASED ON THE QUALITY OF COMMUNICATION

CROSS-REFERENCE TO RELATED APPLICATIONS

The present application claims priority from Japanese Patent Application No. 2022-077728 filed on May 10, 2022 and Japanese Patent Application No. 2023-041334 filed on Mar. 15, 2023, the entire contents of each of which are hereby incorporated by reference.

BACKGROUND

The disclosure relates to a driving assist system.

In the field of vehicles, a development on a so-called connected car has been rapidly advanced.

For the connected car, Japanese Unexamined Patent Application Publication (JP-A) No. 2021-111884 discloses a communication device that achieves more efficient transmission and reception of data. The communication device disclosed in JP-A No. 2021-111884 includes a communicator, a first acquisition unit, a second acquisition unit, and a connection adjustment unit. The communicator communicates with a base station and access points having a communication range narrower than that of the base station. The first acquisition unit acquires vehicle data from an in-vehicle device. The second acquisition unit acquires data on a communication quality for each of the access points. The connection adjustment unit releases a connection state belonging to a determined access point, when the access point at which the connection state is to be released is determined based on the data on the communication quality acquired by the second acquisition unit when the communication with the access points is in the connection state by the communicator.

SUMMARY

An aspect of the disclosure provides a driving assist system that includes a plurality of base stations and a processor. The base stations are configured to be connected to an automated driving vehicle. The processor is configured to execute, via one of the base stations, a traffic control or a remote control of automated driving of the automated driving vehicle, and execute a switching control of switching between the base stations to which the automated driving vehicle is to be connected. The processor is configured to transmit, to the automated driving vehicle and based on a quality of communication between a first base station and the automated driving vehicle and a quality of communication between a second base station and the automated driving vehicle, a switching request of switching from the first base station to the second base station. The first base station is one of the base stations to which the automated driving vehicle is connected. The second base station is another one of the base stations and adjacent to the first base station, and is a candidate of the switching from the first base station. An aspect of the disclosure provides a driving assist system that includes a plurality of base stations, a first processor, and a second processor. The base stations are configured to be connected to an automated driving vehicle. The first processor is configured to execute, via one of the base stations, a traffic control or a remote control of automated driving of the automated driving vehicle. The second processor is provided in the automated driving vehicle, and configured to execute a switching control of switching between the base stations to which the automated driving vehicle is to be connected. The second processor is configured to determine, based on a quality of communication between a first base station and the automated driving vehicle and a quality of communication between a second base station and the automated driving vehicle, whether the switching from the first base station to the second base station is possible. The first base station is one of the base stations to which the automated driving vehicle is connected. The second base station is another one of the base stations and adjacent to the first base station, and is a candidate of the switching from the first base station.

An aspect of the disclosure provides a driving assist system that includes a plurality of base stations, a first processor, and a second processor. The base stations are configured to be connected to an automated driving vehicle. The first processor is configured to execute, via one of the base stations, a traffic control or a remote control of automated driving of the automated driving vehicle. The second processor is provided in each of the base stations, and configured to execute a switching control of switching between the base stations to which the automated driving vehicle is to be connected. The second processor is configured to transmit, to the automated driving vehicle and based on a quality of communication between a first base station and the automated driving vehicle and a quality of communication between a second base station and the automated driving vehicle, a switching request of switching from the first base station to the second base station. The first base station is one of the base stations to which the automated driving vehicle is connected. The second base station is another one of the base stations and adjacent to the first base station, and is a candidate of the switching from the first base station.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
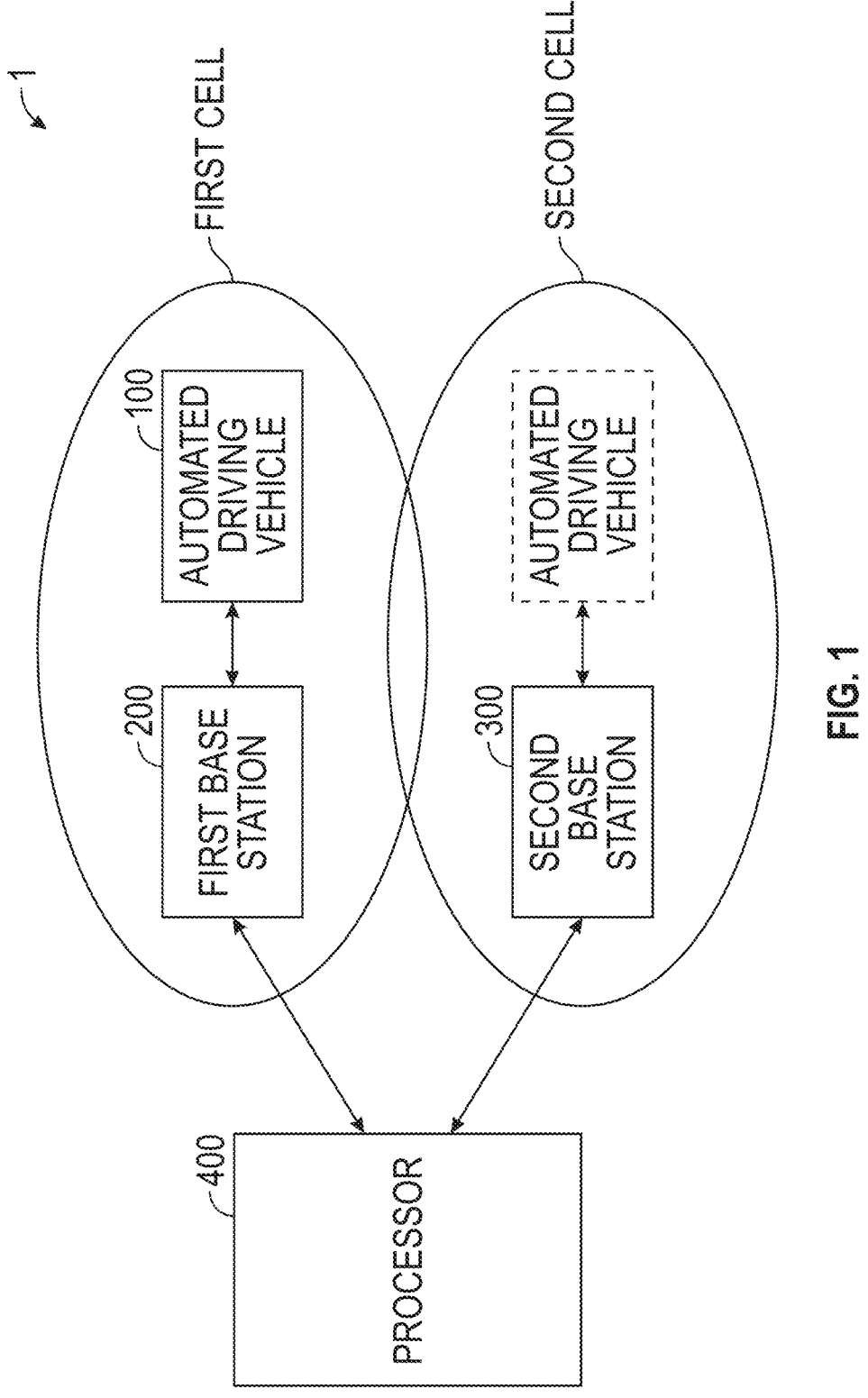
FIG. 1 is a diagram illustrating a configuration of a driving assist system according to one example embodiment of the disclosure.

A communication device disclosed in JP-A No. 2021-111884 assumes that there are multiple access points, including: a case in which a wireless communication is performed with a server or the like using a telephone line network; and a case in which a wireless communication is performed with a server or the like using a wireless LAN (Local Area Network) based on a Wi-Fi standard. Accordingly, JP-A No. 2021-111884 does not assume simply a case in which the wireless communication is performed with the server or the like using the telephone line network.

In addition, the case in which simply the wireless communication is performed with the server or the like using the telephone line network can involve an occurrence of a temporary communication interruption due to a handover, or switching, of base stations. The handover of the base stations occurs when, for example, a vehicle travels over an area provided by a communication carrier.

It is desirable to provide a driving assist system that makes it possible to maintain a continuous communication connection.

In the following, some example embodiments of the disclosure are described in detail with reference to the accompanying drawings including FIGS. 1 to 10. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Embodiment

A driving assist system 1 according to an example embodiment will be described with reference to FIG. 1 to FIG. 6.

Configuration of Driving Assist System 1

Referring to FIG. 1, the driving assist system 1 according to the example embodiment may include an automated driving vehicle 100, a first base station 200, a second base station 300, and a processor 400.

In some embodiments, the driving assist system 1 may include the plurality of base stations and a plurality of vehicles. For illustration purpose, only two base stations and one vehicle are illustrated in FIG. 1, although the number of base stations and the number of vehicles are not limited to those of the example embodiment. These apply similarly to a second example embodiment illustrated in FIG. 7 and a third example embodiment illustrated in FIG. 9.

The automated driving vehicle 100 may be, for example, a connected car that performs traveling based on automated driving. The automated driving vehicle 100 may execute the traveling based on the automated driving, based on data obtained from, for example, a sensor mounted on the automated driving vehicle 100 and data obtained by, for example, communication.

In the example embodiment, the vehicle may be the automated driving vehicle 100. In some embodiments, the vehicle may be a vehicle equipped with a driving assist system.

The first base station 200 and the second base station 300 may be, for example, fixed or mobile radio stations established on land and communicate with a terminal. The first base station 200 and the second base station 300 may perform a wireless communication with the terminal while serving as terminals of a telephone network.

The first base station 200 and the second base station 300 are connected to each other, for example, by a wire (e.g., a telephone line), wirelessly, or by a satellite line.

In the example embodiment, a communication range of the first base station 200 and a communication range of the second base station 300 are assumed to be adjacent to each other. For example, the base stations adjacent to each other may refer to base stations in which respective communication areas, or cells, are adjacent to each other.

The processor 400 may perform a traffic control or a remote control of the automated driving of the automated driving vehicle 100, and perform a switching control of switching the base stations.

In the example embodiment, the processor 400 may sense a connection status between the automated driving vehicle 100 and the first base station 200 and a connection status between the automated driving vehicle 100 and the second base station 300. Further, the processor 400 may control switching from the first base station 200 in communication connection to the second base station 300, based on the connection statuses.

It should be noted that, in a wireless network environment, a communication may be established by an "intensity of a radio wave" and a "quality of data superimposed on the radio wave" between the base station and the communication terminal. The "intensity of a radio wave" may refer to Received Signal Strength Indicator (RSSI). The "quality of data superimposed on the radio wave" may refer to Reference Signal Received Quality (RSRQ).

The "intensity of the radio wave" may indicate a level of the radio wave of the communication between the base station and a communicator 140 of the automated driving vehicle 100. In one embodiment, the communicator 140 may serve as a communication terminal. For example, the level of the radio wave can attenuate and decrease due to an influence of a distance between the base station and the communicator 140 (e.g., the communication terminal) of the automated driving vehicle 100, an obstacle, or the like.

The "quality of data superimposed on the radio wave" may indicate a quality of data of the communication between the base station and the communicator 140 (e.g., the communication terminal) of the automated driving vehicle 100. For example, the quality of the data can deteriorate due to a radio interference caused by another communication and an environmental noise.

The unstable communication due to a decrease in the "intensity of the radio wave" and the "quality of data superimposed on the radio wave" can cause a malfunction such as a communication interruption or a communication delay.

In addition to or instead of the above, Bit Error Rate (BER), Packet Error Rate (PER), and/or a quality of demodulated data (a part of a communication protocol) having been processed by a Radio Frequency (RF) unit that handles a high-frequency band also influence the communication.

This may be referred to as a state in which the communication quality is deteriorated.

In the example embodiment, whether there is a possibility that a malfunction such as the communication interruption or the communication delay can occur may be estimated, based on the communication quality as a measure, to determine whether a "connection status" is good. The "connection status" may refer to a status of a communication connection.

Configuration of Automated Driving Vehicle 100

Figure 2:
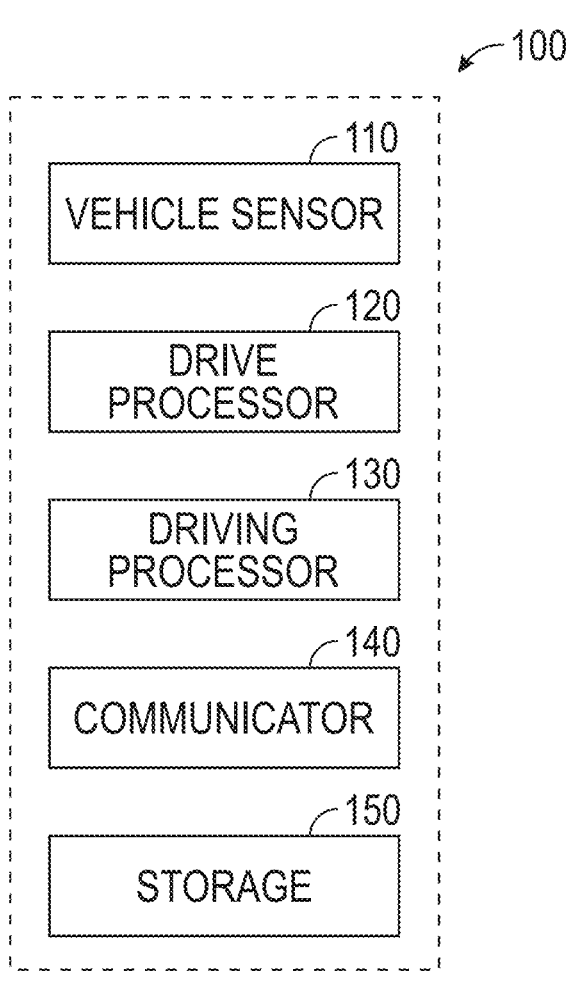
FIG. 2 is a diagram illustrating a configuration of an automated driving vehicle illustrated in FIG. 1.

Referring to FIG. 2, the automated driving vehicle 100 according to the example embodiment may include a vehicle sensor 110, a drive processor 120, a driving processor 130, a communicator 140, and a storage 150.

The vehicle sensor 110 may include a vehicle speed sensor and a sensor that detects data on a traveling state of the automated driving vehicle 100.

The vehicle speed sensor may include, for example, a wheel speed sensor attached to each wheel and a speed calculator, and integrate wheel speeds detected by the wheel speed sensors to derive a speed (a vehicle speed) of the automated driving vehicle 100, and output the derived vehicle speed to the drive processor 120.

Non-limiting examples of the sensor that detects the data on the traveling state of the automated driving vehicle 100 may include: a position sensor that detects, for example, a position of the automated driving vehicle 100; a vehicle speed sensor that detects a speed of the automated driving vehicle 100; an acceleration sensor that detects an acceleration rate; a yaw rate sensor that detects an angular velocity around a vertical axis; and an azimuth sensor that detects an orientation of the automated driving vehicle 100.

The position sensor may detect the position of the automated driving vehicle 100 by, for example, a GPS (Global Positioning System) device. Alternatively, the position sensor may detect the position of the automated driving vehicle 100 by, for example, a GNSS (Global Navigation Satellite System) receiver included in a navigation device.

The vehicle sensor 110 may include, for example, a camera, a radar device, LIDAR (Light Detection and Ranging), and an object recognition device.

These devices may serve as, for example, components that detect a surrounding data of the automated driving vehicle 100.

The camera may be, for example, a digital camera based on a solid-state imaging device such as CCD (Charge Coupled Device) or CMOS (Complementary Metal Oxide Semiconductor), and may be a stereo camera.

The radar device may radiate a radio wave such as a millimeter wave to the periphery of the automated driving vehicle 100 and detect a radio wave (e.g., a reflected wave) reflected by a surrounding object to detect at least a position (a distance and an azimuth) of the object.

The radar device may be mounted at any location of the automated driving vehicle 100 and may detect a position and a speed of an object by a method such as FM-CW (Frequency Modulated Continuous Wave), for example.

The LIDAR may irradiate the surrounding of the automated driving vehicle 100 with an electromagnetic wave having a wavelength close to light, and measure scattered light.

The LIDAR may detect a distance to an object, based on the time from emission of light to reception of the light.

The light to be emitted by the LIDAR may be, for example, pulsed laser light.

The object recognition device may recognize, for example, a position, a type, and a speed of an object present in the vicinity of the automated driving vehicle 100 by performing a sensor fusion process on a detection result based on all or a part of the camera, the radar device, and the LIDAR.

The object recognition device may output a recognition result to the driving processor 130.

The drive processor 120 may apply, for example, a driving force to the automated driving vehicle 100 to cause the automated driving vehicle 100 to travel.

The drive processor 120 may include, for example: a traveling driving force output unit that outputs, to drive wheels, a traveling driving force (e.g., a torque) that causes the automated driving vehicle 100 to travel; a brake unit that outputs a brake torque corresponding to a predetermined braking operation to each wheel; and a steering unit that changes a direction of steered wheels.

The traveling driving force output unit may include a combination of, for example, an internal combustion engine, an electric motor, and a transmission, and ECU (Electronic Control Unit) that controls, for example, the internal combustion engine, the electric motor, and the transmission.

The traveling driving force output unit may control, for example, the internal combustion engine, the electric motor, and the transmission, based on data inputted from an the later-described driving processor 130.

The brake unit may include, for example, a brake caliper, a cylinder that transmits a hydraulic pressure to the brake caliper, an electric motor that generates the hydraulic pressure in the cylinder, and a brake ECU.

The brake ECU may control the electric motor, based on data inputted from the driving processor 130, and output a brake torque corresponding to a braking control to each wheel.

The steering unit may include, for example, a steering ECU and an electric motor.

The electric motor may apply, for example, a force to a rack and pinion mechanism to change the direction of the steered wheels.

The steering ECU may drive the electric motor to change the direction of the steered wheels, based on data inputted from the driving processor 130.

The driving processor 130 may execute, for example, an automated driving control of the automated driving vehicle 100.

The driving processor 130 may execute automated driving by generating driving control data corresponding to: a surrounding state of the automated driving vehicle 100 detected by the vehicle sensor 110; a behavior of the automated driving vehicle 100; control instructions received from an occupant; and control data received from the later-described processor 400 acquired via the first base station 200 or the second base station by communication, and by outputting the thus-generated driving control data to the drive processor 120.

The communicator 140 may be a wireless communication interface that performs a wireless communication with, for example, the automated driving vehicle 100, the first base station 200, the second base station 300, and the processor 400.

The communicator 140 may correspond to multiple wireless access schemes, and may include, for example, a reception processing unit, a transmission processing unit, and an antenna which are not illustrated.

In the example embodiment, for example, the communicator 140 may receive a switching request of switching the base stations from the later-described processor 400, and may switch the base stations to which the communication is to be connected from the first base station 200 to the second base station 300.

The storage 150 may include, for example, HDD (Hard Disk Drive), a flash memory, EEPROM (Electrically Erasable and Programmable Read Only Memory), ROM (Read Only Memory), and RAM (Random Access Memory). The storage 150 may contain, for example, a communication requirement, a control program to be read and executed by a processor, and various other pieces of data.

Configuration of First Base Station 200

Figure 3:
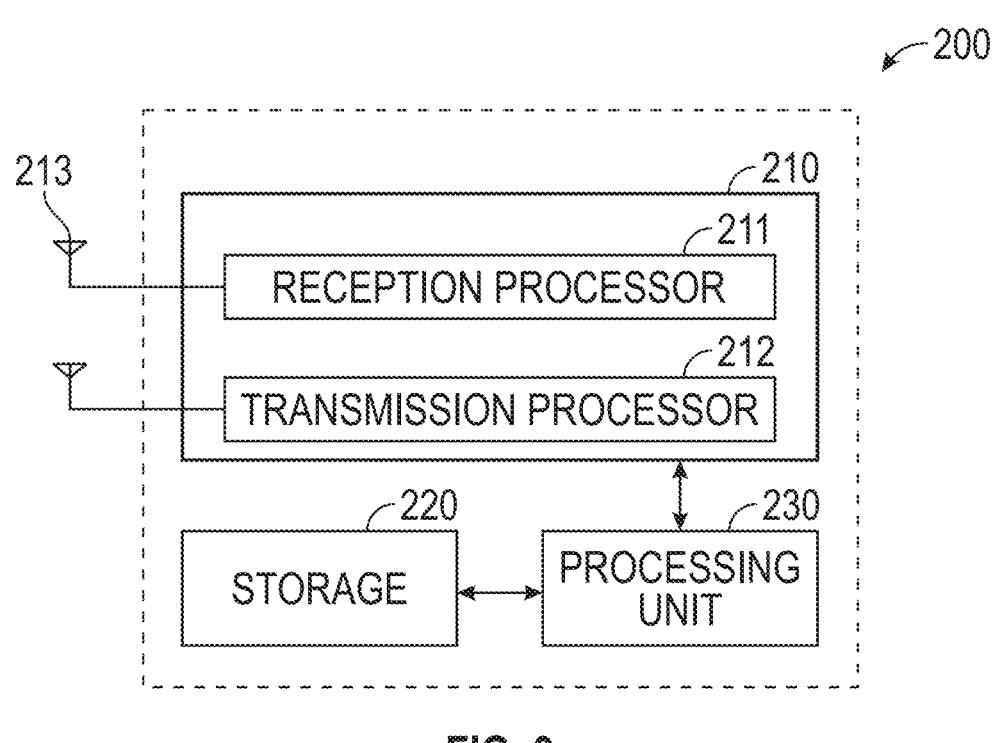
FIG. 3 is a diagram illustrating a configuration of a base station illustrated in FIG. 1.

Referring to FIG. 3, the first base station 200 according to the example embodiment may include a wireless communicator 210, a storage 220, and a processing unit 230.

It should be noted that the second base station 300 has a similar configuration to the first base station 200, and a detailed description thereof will be omitted accordingly.

The wireless communicator 210 may be a wireless communication interface that performs a wireless communication with, for example, the automated driving vehicle 100 and the processor 400.

The wireless communicator 210 may include a reception processor 211, a transmission processor 212, and an antenna 213.

The reception processor 211 may process an uplink signal received via the antenna 213, and may include a wireless reception unit, a demultiplexing unit, a demodulation unit, and a decoding unit which are not illustrated.

The wireless reception unit may perform, on the uplink signal, a down-conversion, a removal of unnecessary frequency components, a control of an amplification level, a quadrature demodulation, a conversion into a digital signal, a removal of a guard interval, an extraction of a frequency domain signal by fast Fourier transform, for example.

The demultiplexing unit may demultiplex an uplink channel such as PUSCH or PUCCH and an uplink reference signal from a signal outputted from the wireless reception unit.

The demodulation unit may perform demodulation of a received signal, based on a modulation method such as BPSK or QPSK on a modulation symbol of the uplink channel.

The decoding unit may perform a decoding process on coded bits of the demodulated uplink channel.

The transmission processor 212 may perform a transmission process of a downlink control data and downlink data via the antenna 213, and may include a coding unit, a modulation unit, a multiplexing unit, and a wireless transmission unit which are not illustrated.

The encoding unit may encode the downlink control data and the downlink data received from the later-described processing unit 230, based on an encoding method such as block encoding, convolutional encoding, or turbo encoding.

The modulation unit may modulate encoded bits outputted from the encoding unit by a predetermined modulation method such as BPSK, QPSK, 16 QAM, 64 QAM, or 256 QAM.

The multiplexing unit may multiplex modulation symbols of each channel and a downlink reference signal, and may arrange them in a predetermined resource element.

The wireless transmission unit may perform various types of signal processes on a signal from the multiplexing unit.

For example, the wireless transmission unit may perform a process such as a conversion into a time domain by fast Fourier transform, an addition of a guard interval, a generation of a baseband digital signal, a conversion into an analog signal, a quadrature modulation, up-conversion, a removal of an extra frequency component, or an amplification of power.

The storage 220 may include a data-readable/writable storage device such as DRAM, SRAM, a flash memory, or a hard disk.

In the example embodiment, the storage 220 may temporarily store switching data.

The switching data may be data to be used by the processor 400 to switch the base stations.

The switching data may include, for example, data such as resource data, trigger data, or timing advance data.

The resource data may be data on a wireless resource to be used by the connected processor 400 to wirelessly communicate with the second base station 300 serving as a switching destination candidate.

The trigger data may be data to be used by the processor 400 to determine whether to switch the connected first base station 200.

The timing advance data may be data related to timing advance for the processor 400 to be connected to the second base station 300 serving as the switching destination candidate.

The processing unit 230 may be a controller that controls each unit of the first base station 200.

The processing unit 230 may include a processor such as CPU (Central Processing Unit) or MPU (Micro Processing Unit).

The processing unit 230 may cause the processor to execute, for example, various programs stored in the storage 220 inside the first base station 200, based on RAM (Random Access Memory) as a working area.

Configuration of Processor 400

Figure 4:
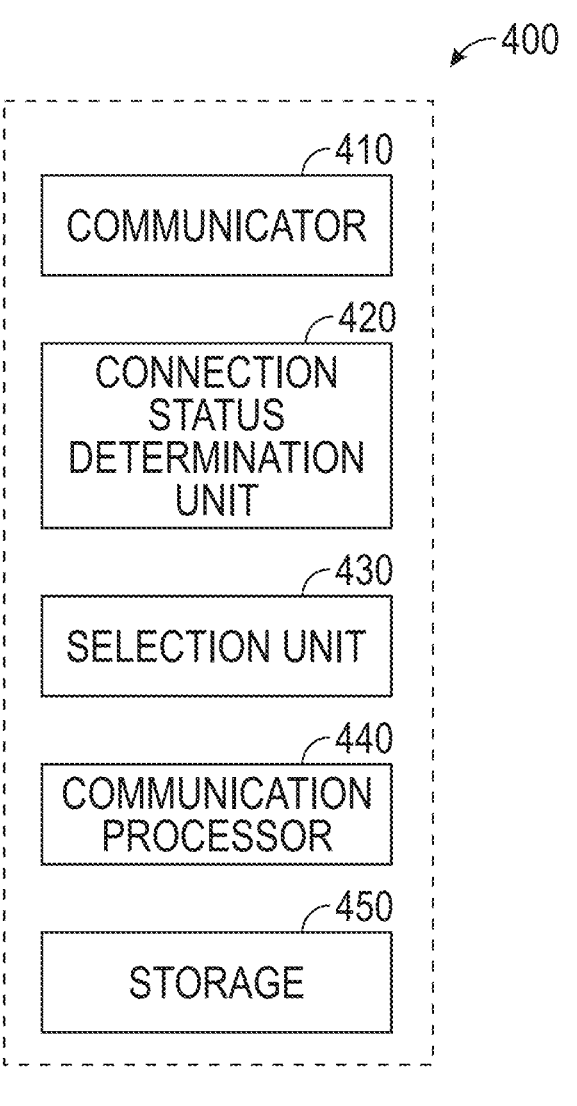
FIG. 4 is a diagram illustrating a configuration of a processor illustrated in FIG. 1.

Referring to FIG. 4, the processor 400 according to the example embodiment may include a communicator 410, a connection status determination unit 420, a selection unit 430, a communication processor 440, and a storage 450.

The communicator 410 may execute a wireless communication with the first base station 200 and the second base station 300, based on, for example, a cellular network in which a 4G or 5G communication scheme is available.

Further, in the example embodiment, the communicator 410 may transmit the switching request of switching the base stations to the communicator 140 of the automated driving vehicle 100.

The connection status determination unit 420 may acquire connection status data of, for example, the first base station 200 or the second base station 300 communicable by the communicator 410, and may determine the connection status of the first base station 200 or the second base station 300.

The selection unit 430 may select whether to maintain a communication with the first base station 200 or to switch to the second base station 300 whose communication range is adjacent to that of the first base station 200, that is, to perform a handover, based on a determination result of the connection status determination unit 420.

In some embodiments, the selection unit 430 may select the switching from the first base station 200 to the second base station 300 adjacent to the first base station 200 when, for example: the connection status of the second base station 300 serving as the switching destination is determined as being good; and the reconnection process time (tRetry) resulting from the switching is determined as being shorter than the time (tEvent) until which any event related to the automated driving that occurs in the future is started.

When the selection unit 430 selects the switching from the first base station 200 to the second base station 300 whose communication range is adjacent to that of the first base station 200, a selection result thereof may be transmitted to the communicator 140 of the automated driving vehicle 100 via the communicator 410 as switching request data on switching the base stations.

The event related to the automated driving may be any event that involves a control to be performed, by the processor 400, as the traffic control or the remote control of the automated driving vehicle 100. Non-limiting examples of such a control may include automatic merging, diverging, lane changing, stopping due to an emergency vehicle, and a Minimal Risk Maneuver (MRM) evacuation control.

For example, the traffic control may include a merging control that performs, in a merging section of a first lane and a second lane having a lower traveling priority than the first lane, a traveling control for merging with respect to a first vehicle that travels in the first lane or a second vehicle that travels in the second lane.

Any of these automated driving events may involve the time, from a start to an end of the control, that is longer than the time necessary for the handover.

Data on the automated driving event, including the timing of the automated driving event that occurs in the future, may be, constantly without limitation, transmitted from the processor 400 to the automated driving vehicle 100. For example, the data on the automated driving event, including the time until which the automated driving event that occurs in the future is started, may be transmitted from the processor 400 to the automated driving vehicle 100.

The communication processor 440 may perform various kinds of control that transmits various kinds of data selected by the selection unit 430, for example, to the second base station 300.

For example, the communication processor 440 may generate a connection request that allows for a communication with the second base station 300 selected by the selection unit 430, and may transmit instruction data including the generated connection request to the second base station 300.

The storage 450 may include, for example, HDD, a flash memory, EEPROM, ROM, or RAM.

The storage 450 may contain, for example, a communication requirement, a program to be read and executed by a processor, and various other pieces of data.

In addition, the storage 450 may contain data on a base station including map data and a base station number.

Process of Driving Assist System 1

A process of the driving assist system 1 according to the example embodiment will be described with reference to FIG. 5 and FIG. 6.

Figure 5:
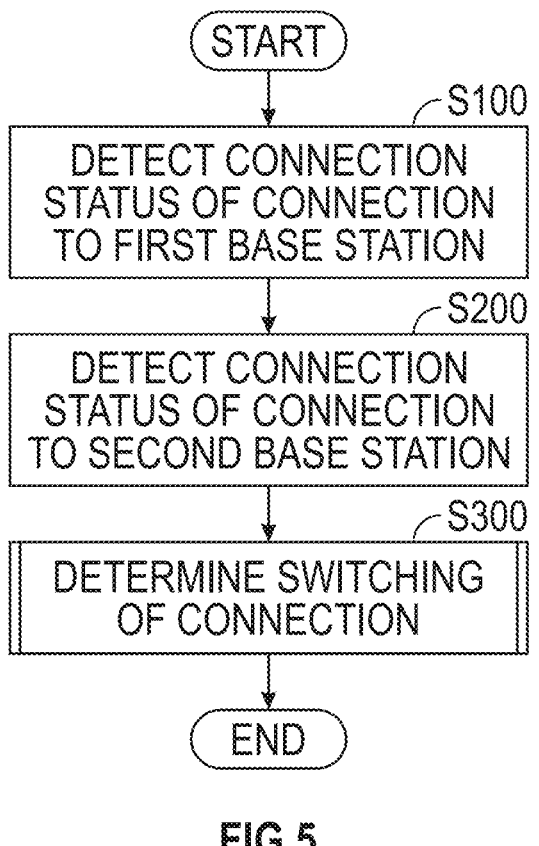
FIG. 5 is a diagram illustrating a process of the driving assist system illustrated in FIG. 1.

Referring to FIG. 5, the connection status determination unit 420 of the processor 400 may acquire the data on the connection status from the first base station 200 (step S100).

Thereafter, the connection status determination unit 420 of the processor 400 may acquire the data on the connection status from the second base station 300 (step S200).

Thereafter, the selection unit 430 of the processor 400 may request the communicator 140 of the automated driving vehicle 100 to switch from the first base station 200 to the second base station 300, based on the acquired connection status of connection to the first base station 200, the acquired connection status of connection to the second base station 300, and whether the reconnection process time (tRetry) resulting from the switching is shorter than the time (tEvent) until which any event related to the automated driving that occurs in the future is started, and the communicator 140 of the automated driving vehicle 100 may execute the switching control and end the process (step S300).

It should be noted that details on the switching control performed in 5300 will be described later.

Referring back to FIG. 1, the first base station 200 and the second base station 300 may be so provided that their respective communication areas overlap with each other. The communicator 140 in the automated driving vehicle 100 may switch radio wave channels, based on radio wave status (RSSI and RSRQ) from the first base station 200 or the second base station 300.

For the switching process, in step 5300, the switching control may be executed based on the connection status of connection to the first base station 200, the connection status of connection to the second base station 300, and whether the reconnection process time (tRetry) resulting from the switching is shorter than the time (tEvent) until which any event related to the automated driving that occurs in the future is started.

Switching Process of Processor 400

Figure 6:
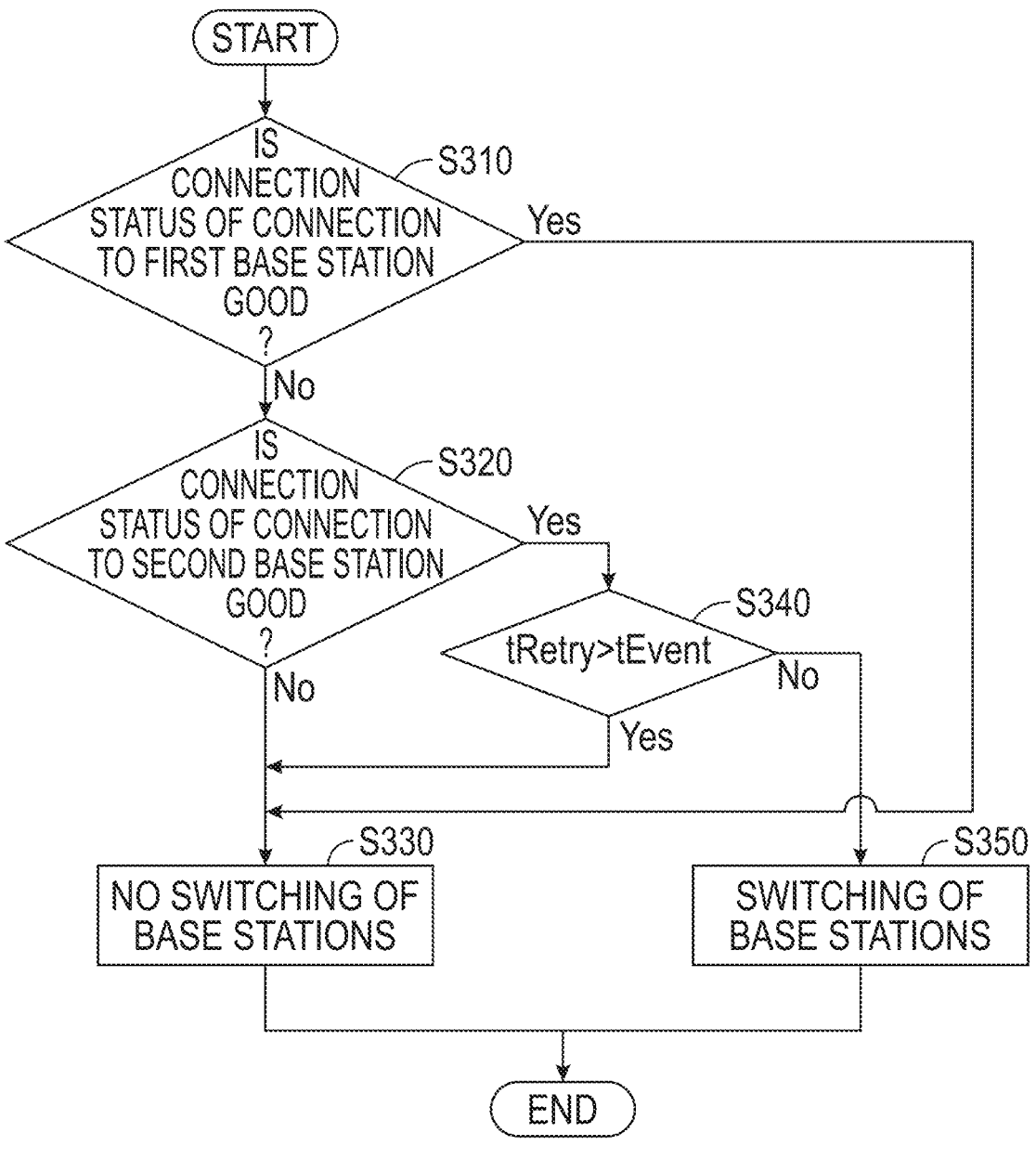
FIG. 6 is a flowchart illustrating a switching process of the processor illustrated in FIG. 1.

Referring to FIG. 6, the connection status determination unit 420 of the processor 400 may determine whether the connection status between the automated driving vehicle 100 and the first base station 200 is good (step S310).

If the connection status determination unit 420 determines that the connection status between the automated driving vehicle 100 and the first base station 200 is good ("YES" in step S310), the processor 400 does not perform the switching to the second base station 300, maintain the connection between the automated driving vehicle 100 and the first base station 200, and end the process (step S330).

If the connection status determination unit 420 determines that the connection status between the automated driving vehicle 100 and the first base station 200 is not good ("NO" in step S310), the connection status determination unit 420 may determine whether the connection status between the automated driving vehicle 100 and the second base station 300 is good (step S320).

If the connection status determination unit 420 determines that the connection status between the automated driving vehicle 100 and the second base station 300 is not good ("NO" in step S320), the processor 400 does not perform the switching to the second base station 300, maintain the connection between the automated driving vehicle 100 and the first base station 200, and end the process (step S330).

If the connection status determination unit 420 determines that the connection status between the automated driving vehicle 100 and the second base station 300 is good ("YES" in step S320), the selection unit 430 may determine whether the reconnection process time (tRetry) resulting from the switching is longer than the time (tEvent) until which any event related to the automated driving that occurs in the future is started, i.e., may determine whether a reconnection process is to be executed during any event related to the automated driving (step S340).

If the selection unit 430 determines that the reconnection process time (tRetry) resulting from the switching is longer than the time (tEvent) until which any event related to the automated driving that occurs in the future is started ("YES" in step S340), the processor 400 does not perform the switching to the second base station 300, maintain the connection between the automated driving vehicle 100 and the first base station 200, and end the process (step S330).

If the selection unit 430 determines that the reconnection process time (tRetry) resulting from the switching is shorter than the time (tEvent) until which any event related to the automated driving that occurs in the future is started ("NO" in step S340), the switching from the first base station 200 to the second base station 300 may be executed by transmitting, via the communicator 410, the switching request data on switching the base stations to the communicator 140 of the automated driving vehicle 100 by the selection unit 430, and the process may be ended (step S350).

Workings and Example Effects

The driving assist system 1 according to the example embodiment includes: the automated driving vehicle 100 including the communicator 140; the first base station 200 connected to the automated driving vehicle 100; the second base station 300 that is adjacent to the first base station 200 and serves as a switching destination candidate; and the processor 400 configured to execute the traffic control or the remote control of the automated driving of the automated driving vehicle 100 and execute the switching control of the base stations. The processor 400 is configured to transmit, to the communicator 140 of the automated driving vehicle 100, the switching request of switching to the second base station 300, based on the connection status between the automated driving vehicle 100 and the first base station 200 via the first base station 200 or the connection status between the automated driving vehicle 100 and the second base station 300 via the second base station 300.

For example, the communicator 140 of the automated driving vehicle 100 may receive the switching request of switching to the second base station 300, based on the connection status between the automated driving vehicle 100 and the first base station 200 via the first base station 200 or the connection status between the automated driving vehicle 100 and the second base station 300 via the second base station 300, transmit the connection release request to the first base station 200, and transmit the connection request to the second base station 300 to execute the switching control of switching the connection destination from the first base station 200 to the second base station 300.

Accordingly, it helps to maintain the continuous communication connection and prevent the interruption of the automated driving control.

In some embodiments, the processor 400 of the driving assist system 1 may be configured to determine whether the switching request is transmittable by the communicator 140, based on: the connection status between the automated driving vehicle 100 and the first base station 200 via the first base station 200 or the connection status between the automated driving vehicle 100 and the second base station 300 via the second base station 300; a timing of a control process to be performed on the automated driving vehicle 100; and the reconnection time necessary for the switching.

For example, when the processor 400 determines that the connection status between the automated driving vehicle 100 and the second base station 300 via the second base station 300 is good and that the reconnection process time resulting from the switching is shorter than the time until which any event related to the automated driving that occurs in the future is started, the communicator 140 of the automated driving vehicle 100 may receive the switching request of switching to the second base station 300, transmit the connection release request to the first base station 200, and transmit the connection request to the second base station 300 to execute the switching control of switching the connection destination from the first base station 200 to the second base station 300.

Accordingly, it helps to maintain the continuous communication connection and prevent the interruption of the automated driving control.

Second Embodiment

A driving assist system 1A according to a second example embodiment will be described with reference to FIG. 7 and FIG. 8.

Configuration of Driving Assist System 1A

Figure 7:
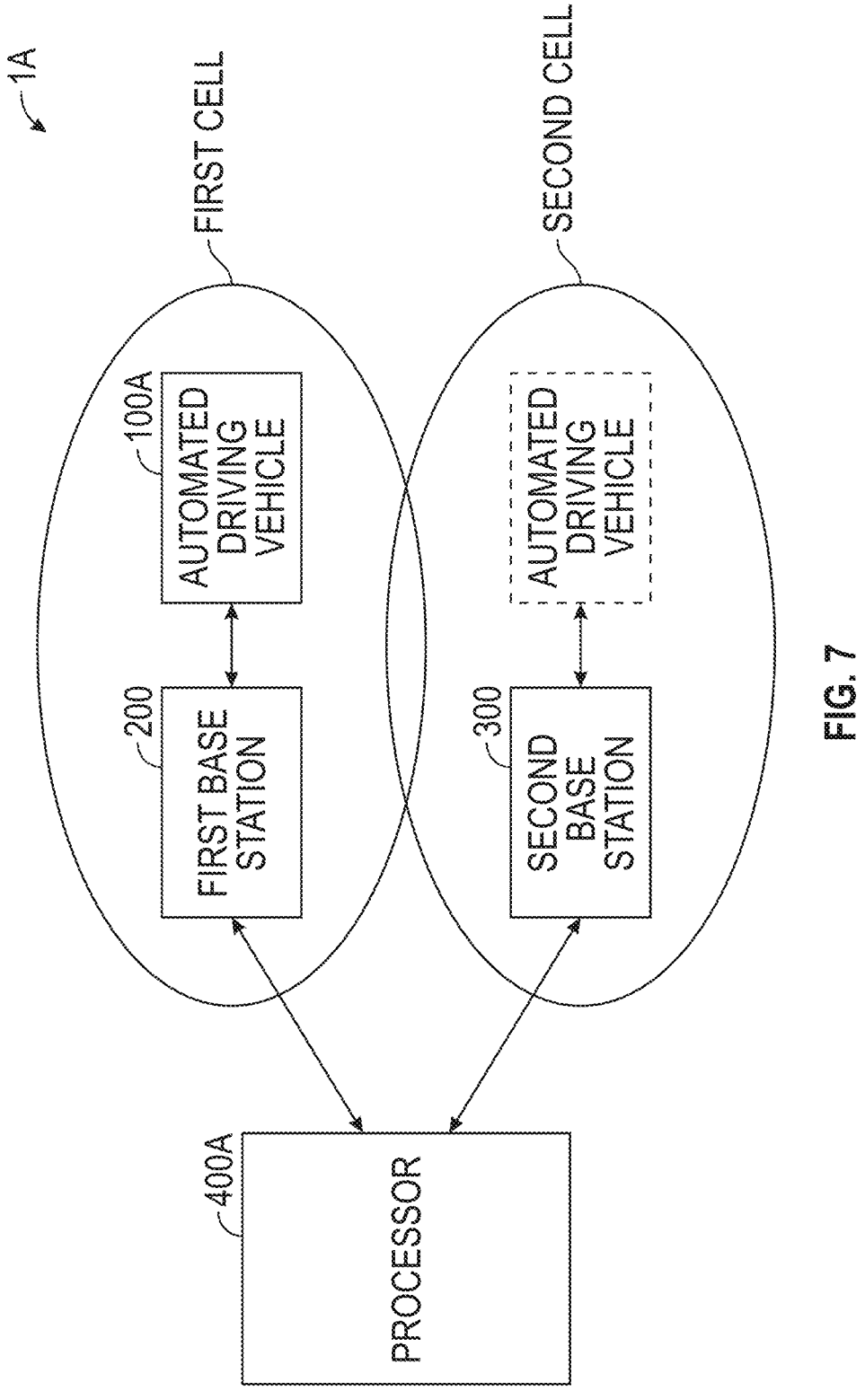
FIG. 7 is a diagram illustrating a configuration of a driving assist system according to one example embodiment of the disclosure.

Referring to FIG. 7, the driving assist system 1A according to the second example embodiment may include an automated driving vehicle 100A, the first base station 200, the second base station 300, and a processor 400A.

The automated driving vehicle 100A may include a configuration of a second processor 500 that is included in the processor 400 in the first example embodiment.

Figure 8:
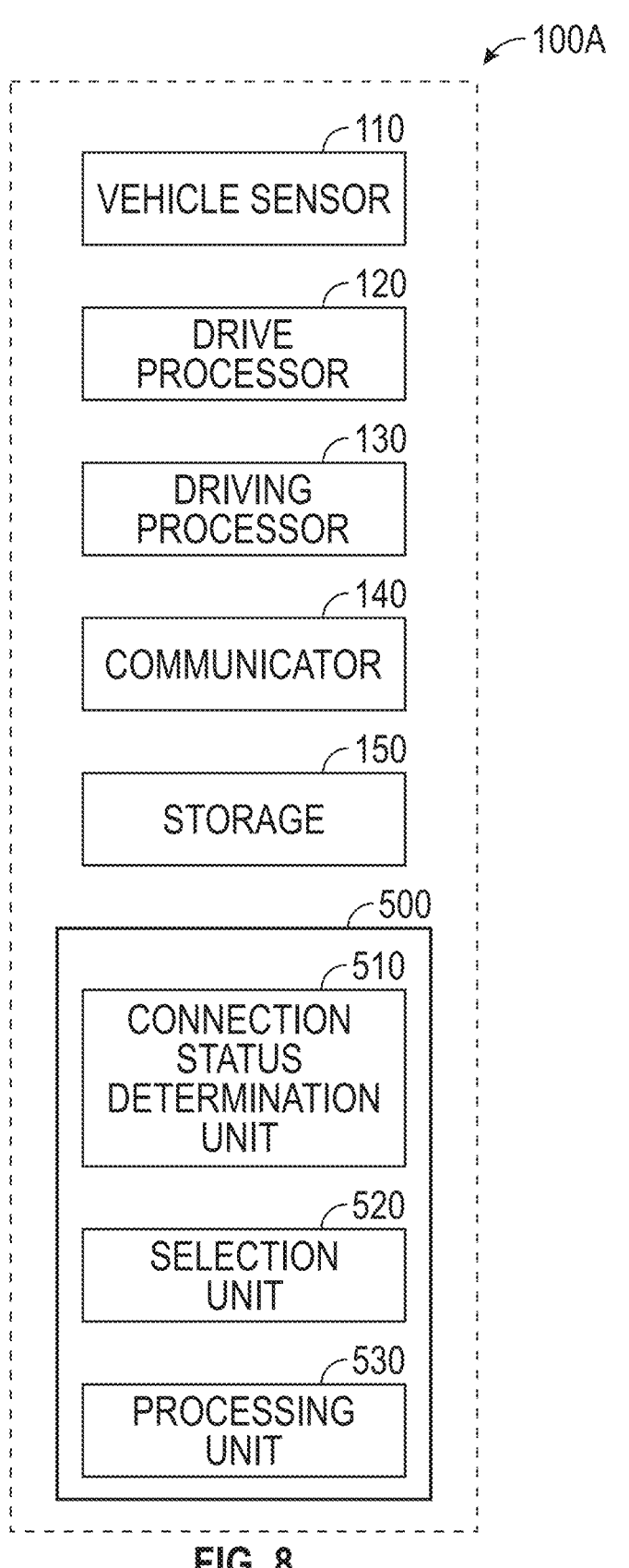
FIG. 8 is a diagram illustrating a configuration of an automated driving vehicle illustrated in FIG. 7.

For example, the processor 400A of the second example embodiment may serve as a first processor, and the connection status determination unit 420, the selection unit 430, and the communication processor 440 that are included in the processor 400 according to the first example embodiment may be transferred, to the automated driving vehicle 100A, as the second processor 500 that includes a connection status determination unit 510, a selection unit 520, and a communication processor 530 as illustrated in FIG. 8. In one embodiment, the processor 400A may serve as a "first processor". In one embodiment, the second processor 500 may serve as a "second processor".

The process of detecting the connection statuses of connection to the respective base stations performed, in steps S100 and S200 of FIG. 5, by the connection status determination unit 420 in the first example embodiment may be performed by the connection status determination unit 510, based on communication levels between the base stations and the automated driving vehicle 100A sensed by the communicator 140.

The process of switching the base stations performed, in step 300 of FIG. 5, i.e., from step 310 to step S350 of FIG. 6, by the selection unit 430 in the first example embodiment may be performed by the selection unit 520. When the switching from the first base station 200 to the second base station 300 is selected by the selection unit 520, the communication processor 530 may generate the connection request for the automated driving vehicle 100A to communicate with the second base station 300, and transmit the instruction data including the generated connection request to the second base station 300.

In the second example embodiment, the data on the automated driving event may be, constantly without limitation, transmitted from the processor 400A to the automated driving vehicle 100A, and the automated driving vehicle 100A may determine whether the switching is possible based on the transmitted data on the automated driving event.

Workings and Example Effects

In the driving assist system 1A according to the second example embodiment, the second processor 500 including the connection status determination unit 510, the selection unit 520, and the communication processor 530 may be transferred to the automated driving vehicle 100A.

Providing the second processor 500 in the automated driving vehicle 100A helps to accurately sense the connection status between the first base station 200 and the automated driving vehicle 100A or the connection status between the second base station 300 and the automated driving vehicle 100A.

Accordingly, this configuration helps to allow the second processor 500 to request the second base station 300 to switch the base stations, based on a determination result made by the connection status determination unit 510, which helps to immediately switch the base stations to which the communication is to be connected from the first base station 200 to the second base station 300.

Third Embodiment

A driving assist system 1B according to a third example embodiment will be described with reference to FIG. 9 and FIG. 10.

Configuration of Driving Assist System 1B

Figure 9:
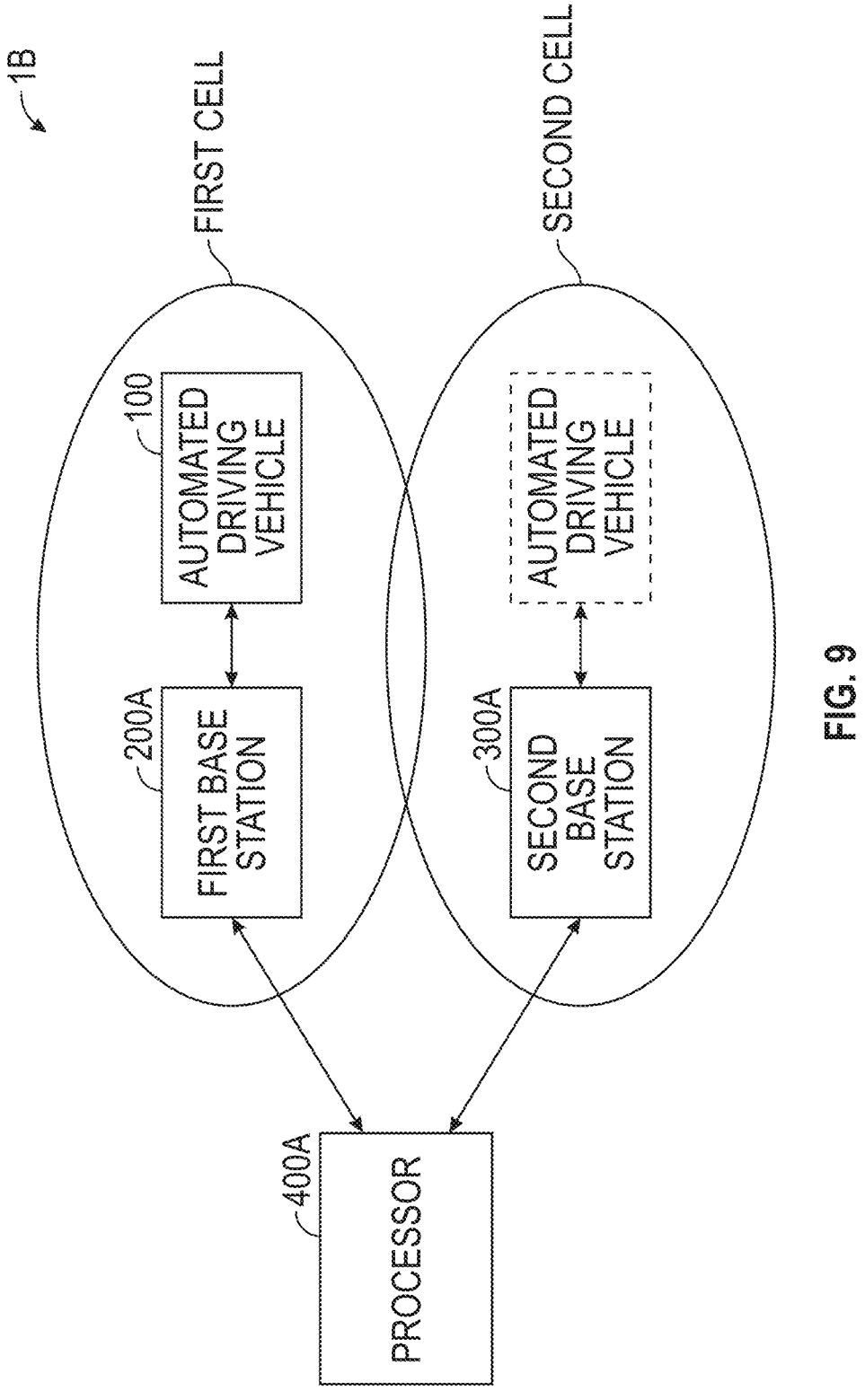
FIG. 9 is a diagram illustrating a configuration of a driving assist system according to one example embodiment of the disclosure.

Referring to FIG. 9, the driving assist system 1B according to the third example embodiment may include the automated driving vehicle 100, a first base station 200A, a second base station 300A, and the processor 400A.

The first base station 200A and the second base station 300A each may include the configuration of the second processor 500 of the second example embodiment.

Figure 10:
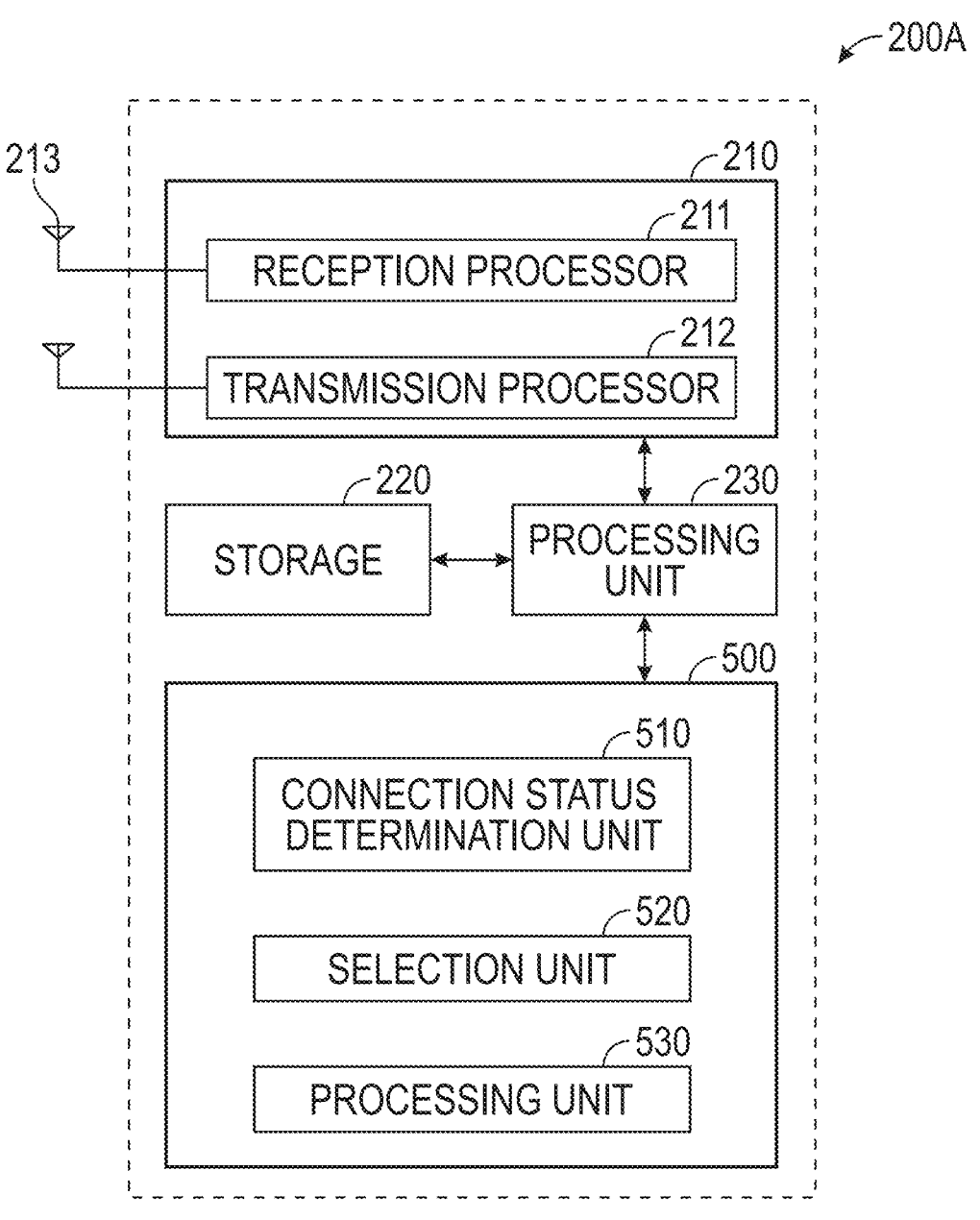
FIG. 10 is a diagram illustrating a configuration of a base station illustrated in FIG. 9.

For example, the processor 400A of the third example embodiment may serve as the first processor, and the connection status determination unit 420, the selection unit 430, and the communication processor 440 that are included in the processor 400 according to the first example embodiment may be transferred, to each of the first base station 200A and the second base station 300A, as the second processor 500 that includes the connection status determination unit 510, the selection unit 520, and the communication processor 530 as illustrated in FIG. 10. In one embodiment, the processor 400A may serve as a "first processor". In one embodiment, the second processor 500 may serve as a "second processor".

The process of detecting the connection statuses of connection to the respective base stations performed, in steps S100 and S200 of FIG. 5, by the connection status determination unit 420 in the first example embodiment may be performed by the connection status determination unit 510 in the first base station 200A. The connection status determination unit 510 in the first base station 200A may determine a connection status between an own base station and the automated driving vehicle 100, based on a communication level between the own base station and the automated driving vehicle 100 sensed by the wireless communicator 210. Communication levels between each of the base stations 200A and 300A and the automated driving vehicle 100 sensed by the communicator 140 of the automated driving vehicle 100 may be transmitted to each of the base stations 200A and 300A, and the connection status determination unit 510 in each of the base stations 200A and 300A may determine, based on the transmitted data, a connection status between another relevant one of the base stations 200A and 300A and the automated driving vehicle 100.

The process of switching the base stations performed, in step 300 of FIG. 5, i.e., from step 310 to step S350 of FIG. 6, by the selection unit 430 in the first example embodiment may be performed by the selection unit 520 of the first base station 200A. When the switching from the first base station 200A to the second base station 300A is selected by the selection unit 520, the communication processor 530 of the first base station 200A may generate the connection request for the automated driving vehicle 100 to communicate with the second base station 300A, and transmit the instruction data including the generated connection request to the automated driving vehicle 100 and the second base station 300A.

In the third example embodiment, the data on the automated driving event may be, constantly without limitation, transmitted from the processor 400A to each of the base stations 200A and 300A, and the base stations 200A and 300A each may determine whether the switching is possible based on the transmitted data on the automated driving event.

Workings and Example Effects

In the driving assist system 1B according to the third example embodiment, the second processor 500 including the connection status determination unit 510, the selection unit 520, and the communication processor 530 may be transferred to each of the first base station 200A and the second base station 300A.

Providing the second processor 500 in each of the first base station 200A and the second base station 300A helps to accurately sense the connection status between the first base station 200A and the automated driving vehicle 100 or the connection status between the second base station 300A and the automated driving vehicle 100.

Accordingly, this configuration helps to make the request of switching the base stations from the connected first base station 200A to the automated driving vehicle 100 and the second base station 300A, based on a determination result made by the connection status determination unit 510, which helps to immediately switch the base stations to which the communication is to be connected from the first base station 200A to the second base station 300A.

Modification Examples

The first example embodiment to the third example embodiment have been described above with reference to an example in which the switching of the base stations to which the communication is to be connected is made based on a current connection status.

In some embodiments, when it is possible to foreseen in advance, for example, a congestion of communication due to a future radio wave environment, e.g., due to an increase in the number of terminals connected resulting from a traffic congestion, the handover to the base station in which the connection status is good, e.g., the base station in which a communication speed and a communication quality are high may be performed in advance.

Executing such a process helps to shorten the reconnection time that occurs at the time of the handover.

In some embodiments, it is possible to implement the driving assist system 1, 1A, or 1B of the example embodiment of the disclosure by recording the process to be executed by the processor 400 or 400A on a non-transitory recording medium readable by a computer system, and causing the computer system to load the program recorded on the non-transitory recording medium onto the processor 400 or 400A to execute the program. The computer system as used herein may encompass an operating system (OS) and a hardware such as a peripheral device.

In addition, when the computer system utilizes a World Wide Web (WWW) system, the "computer system" may encompass a website providing environment (or a website displaying environment). The program may be transmitted from a computer system that contains the program in a storage device or the like to another computer system via a transmission medium or by a carrier wave in a transmission medium. The "transmission medium" that transmits the program may refer to a medium having a capability to transmit data, including a network (e.g., a communication network) such as the Internet and a communication link (e.g., a communication line) such as a telephone line.

Further, the program may be directed to implement a part of the operation described above. The program may be a so-called differential file (differential program) configured to implement the operation by a combination of a program already recorded on the computer system.

According to at least one embodiment of the disclosure, it is possible to provide a driving assist system that makes it possible to maintain a continuous communication connection.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

The processor 400 illustrated in FIG. 1 and the second processor 500 illustrated in FIGS. 7 and 9 are each implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 400 or the second processor 500. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 400 illustrated in FIG. 1 or the second processor 500 illustrated in FIGS. 7 and 9.

The invention claimed is:

1. A driving assist system comprising:
a first base station configured to:
communicate with an automated driving vehicle via a first wireless communication; and
generate first information regarding a connection status of the first wireless communication between the first base station and the automated driving vehicle;
a second base station, different from the first base station, configured to:
communicate with the automated driving vehicle via a second wireless communication; and
generate second information regarding a connection status of the second wireless communication between the second base station and the automated driving vehicle; and
a processor, disposed at a location different from the automated driving vehicle, and configured to:
communicate with the first base station and the second base station;
execute, via the first wireless communication, a first control to perform (i) a traffic control of the automated driving vehicle or (ii) a remote control of the automated driving vehicle;
execute, via the second wireless communication, a second control to perform (i) the traffic control of the automated driving vehicle or (ii) the remote control of the automated driving vehicle;
receive the first information and the second information from the first base station and the second base station;
determine, based on the first information, whether a communication interruption or a communication delay is expected to occur in the first wireless communication, when the processor is executing the first control and not executing the second control;
in response to a determination that a communication interruption or a communication delay is expected to occur in the first wireless communication, determine, based on the second information, whether a communication interruption or a communication delay is expected to occur in the second wireless communication;
in response to a determination that a communication interruption or a communication delay is expected not to occur in the second wireless communication, determine whether a first time required to terminate execution of the first control and start execution of the second control is longer than a second time until a start of an event related to automated driving scheduled to start in the future;
in response to a determination that the first time is not longer than the second time, (i) generate a switching request signal to terminate the first wireless communication and start the second wireless communication and (ii) transmit the switching request signal to the automated driving vehicle via the first wireless communication, wherein the automated driving vehicle is configured to, in response to receiving the switching request signal, (i) transmit a connection release request to the first base station via the first wireless communication to request termination of the first wireless communication, and (ii) transmit a connection request to the second base station to request establishment of the second wireless communication; and in response to (i) a determination that a communication interruption or a communication delay is expected to occur in the second wireless communication, or (ii) a determination that the first time is longer than the second time, refrain from generating the switching request signal.

2. The driving assist system according to claim 1, wherein the first information includes information indicating one or both of an intensity of a radio wave and a quality of data superimposed on the radio wave between the first base station and the automated driving vehicle, and wherein the second information includes information indicating one or both of an intensity of a radio wave and a quality of data superimposed on the radio wave between the second base station and the automated driving vehicle.

3. The driving assist system according to claim 2, wherein the processor is further configured to:

determine that a communication interruption or a communication delay is expected not to occur in the first wireless communication when the processor estimates, based on the first information, that a communication interruption or a communication delay does not occur in the first wireless communication;

determine that a communication interruption or a communication delay is expected to occur in the first wireless communication when the processor estimates, based on the first information, that a communication interruption or a communication delay occurs in the first wireless communication;

determine that a communication interruption or a communication delay is expected not to occur in the second wireless communication when the processor estimates, based on the second information, that a communication interruption or a communication delay does not occur in the second wireless communication; and determine that a communication interruption or a communication delay is expected to occur in the second wireless communication when the processor estimates, based on the second information, that a communication interruption or a communication delay occurs in the second wireless communication.

4. The driving assist system according to claim 3, wherein the event related to the automated driving includes execution, by the processor, of a traveling control of the automated driving vehicle in a section where a plurality of lanes merge.

* * * * *